United States Patent
Poulsen et al.

(10) Patent No.: US 12,421,936 B2
(45) Date of Patent: Sep. 23, 2025

(54) METHOD AND A KIT FOR INSTALLING AT LEAST ONE DAMPER UNIT IN A TOWER SECTION OF A WIND TURBINE

(71) Applicant: Vestas Wind Systems A/S, Aarhus (DK)

(72) Inventors: Johan Thrane Poulsen, Randers (DK); Matias Rørbæk Primdahl, Braband (DK); Mikkel Quist Nielsen, Odense (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/810,600

(22) Filed: Aug. 21, 2024

(65) Prior Publication Data

US 2025/0067248 A1 Feb. 27, 2025

(30) Foreign Application Priority Data

Aug. 22, 2023 (DK) .......................... PA 2023 70430

(51) Int. Cl.
*F03D 13/10* (2016.01)
*F03D 13/20* (2016.01)
(Continued)

(52) U.S. Cl.
CPC .......... *F03D 13/112* (2023.08); *F03D 13/139* (2023.08); *F03D 13/201* (2023.08);
(Continued)

(58) Field of Classification Search
CPC ............ F16F 15/0232; F05B 2260/964; F05B 2230/604; F05B 2230/61; F03D 13/112; F03D 13/139; F03D 13/201; F03D 80/88
See application file for complete search history.

(56) References Cited

U.S. PATENT DOCUMENTS

| 11,585,405 B2 * | 2/2023 | Rumler ...................... B61B 3/00 |
| 2021/0332866 A1 | 10/2021 | Kumar et al. |
| 2023/0331524 A1 * | 10/2023 | Wijning .................. B66C 23/52 |

FOREIGN PATENT DOCUMENTS

| CN | 102828922 A | 12/2012 |
| CN | 202746122 U | 2/2013 |

(Continued)

OTHER PUBLICATIONS

Danish Patent and Trademark Office, technical examination and search report issued in corresponding DK Application No. PA 2023 70430, dated Feb. 16, 2024.
(Continued)

*Primary Examiner* — Andrew J Triggs
(74) *Attorney, Agent, or Firm* — Wood Herron & Evans LLP

(57) ABSTRACT

A method for installing at least one damper unit in a tower section of a wind turbine tower is disclosed. The tower section is arranged with its centre axis in a substantially horizontal orientation, and a guiderail is introduced into the tower section. A trolley is mounted on a part of the guiderail extending out of the tower section, the damper unit is mounted on the trolley, and the trolley with the damper unit is moved along the guiderail to a position inside the tower section. The damper unit is positioned in an installation position being vertically offset from the centre axis of the tower section, wherein the positioning comprises elevating the damper unit, and the damper unit is attached to the tower section at the installation position.

14 Claims, 18 Drawing Sheets

(51) Int. Cl.
    *F03D 80/80*     (2016.01)
    *F16F 15/023*     (2006.01)

(52) U.S. Cl.
    CPC .......... *F03D 80/88* (2016.05); *F16F 15/0232* (2013.01); *F05B 2230/604* (2013.01); *F05B 2230/61* (2013.01); *F05B 2260/964* (2013.01)

(56) References Cited

FOREIGN PATENT DOCUMENTS

| | | |
|---|---|---|
| CN | 112431320 A | 3/2021 |
| CN | 214989897 U | 12/2021 |
| EP | 3156647 A1 | 4/2017 |
| EP | 3705718 A1 | 9/2020 |

OTHER PUBLICATIONS

International Searching Authority, International Search Report and Written Opinion issued in corresponding PCT Application No. PCT/DK2024/050196, datedSep. 20, 2024.

\* cited by examiner

METHOD AND A KIT FOR INSTALLING AT LEAST ONE DAMPER UNIT IN A TOWER SECTION OF A WIND TURBINE

FIELD OF THE INVENTION

The present invention relates to a method for installing at least one damper unit in a tower section of a wind turbine while the tower section is arranged with its centre axis in a substantially horizontal orientation. The method according to the invention ensures appropriate introduction of the at least one damper unit into the tower section, as well as appropriate mounting of the at least one damper unit inside the tower section. The invention further relates to a kit for use when performing the method.

BACKGROUND

Modern wind turbines normally comprise a tower mounted on an onshore or offshore foundation and a nacelle mounted on top of the tower. The nacelle carries a rotor with one or more wind turbine blade. Wind acting on the wind turbine blades causes the rotor to rotate, and the rotational movement is transferred to a generator, possibly via a gear system, where the mechanical energy is transformed into electrical energy. Furthermore, the nacelle normally accommodates various heavy components, such as generator and gear system. Accordingly, the nacelle, with the rotor and the components accommodated in the nacelle, form a heavy mass arranged on top of the tower.

During operation, wind turbines may be subjected to dynamic loads of random character, primarily originating from wind acting on the various parts of the wind turbine, in particular on the rotor. Such dynamic loads may cause movements of the heavy mass formed by the nacelle with the rotor and the components accommodated in the nacelle. This may cause oscillation modes of the wind turbine tower to be excited, leading to a high load impact on the wind turbine, in particular on the tower.

In order to address the problems related to wind induced oscillations of the nacelle and the tower, one or more damper units may be installed in the upper part of the tower, near the nacelle. Such damper units reduce the oscillatory motions of the nacelle and the tower, and they may be tuned to match frequencies of oscillation modes of the tower.

Damper units are relatively heavy, and may weigh up to 20 t, and it is therefore difficult to mount the damper units in the upper part of the tower after the tower has been erected. Instead, damper units may be mounted in the uppermost tower section before the tower is erected, possibly while the tower section is arranged with its centre axis in a substantially horizontal orientation, and the uppermost tower section may subsequently be installed with the at least one damper unit mounted inside. However, when mounting a damper unit in a tower section in this manner, an appropriate and desired installation position for the may not be readily reached.

SUMMARY

It is an object of embodiments of the invention to provide a method for installing at least one damper unit in a tower section of a wind turbine tower, which ensures appropriate introduction of the at least one damper unit into the tower section as well as appropriate mounting of the at least one damper unit inside the tower section.

It is a further object of embodiments of the invention to provide an installation kit for installing a damper unit in a tower section of a wind turbine tower, which enables appropriate introduction of the damper unit into the tower section as well as appropriate mounting of the damper unit inside the tower section.

According to a first aspect the invention provides a method for installing at least one damper unit in a tower section of a wind turbine tower, the tower section having a centre axis extending in a longitudinal direction of the tower section, the method comprising the steps of:

arranging the tower section with its centre axis in a substantially horizontal orientation, introducing a guiderail into the tower section, via an end of the tower section, in such a manner that part of the guiderail is arranged inside the tower section and part of the guiderail extends out of the tower section, mounting a trolley on a part of the guiderail extending out of the tower section, and mounting the damper unit on the trolley, moving the trolley with the damper unit along the guiderail to a position inside the tower section, positioning the damper unit in an installation position being vertically offset from the centre axis of the tower section, wherein the positioning comprises elevating the damper unit, and attaching the damper unit to the tower section at the installation position.

Thus, according to the first aspect, the invention provides a method for installing at least one damper unit in a tower section of a wind turbine tower. The tower section may advantageously be a tower section which is intended to form an uppermost tower section of the wind turbine tower once the wind turbine tower has been erected.

The damper unit may be of a kind that is known per se, e.g. a tuned mass damper. As non-limiting examples, a tuned liquid sloshing damper, a pendulum damper, an impact damper or a spring-mass damper may be applied.

The tower section defines a longitudinal direction, and it has a centre axis which extends in the longitudinal direction. The tower section may have a cylindrical shape or slightly inclining conical shape, and the centre axis may accordingly be regarded as defining a cylindrical symmetry axis of the tower section.

In the method according to the first aspect of the invention, the tower section is initially arranged with its centre axis in a substantially horizontal orientation. This could, e.g., include arranging the tower section on the ground with a side wall contacting the ground or a suitable support arrangement, and with openings formed at the ends of the tower section providing access to the interior of the tower section.

Next, a guiderail is introduced into the tower section, via an end of the tower section. This is done in such a manner that part of the guiderail is arranged inside the tower section and part of the guiderail extends out of the tower section. Accordingly, the guiderail defines a path from a position outside the tower section to a position inside the tower section.

Next, a trolley is mounted on a part of the guiderail extending out of the tower section, and the damper unit to be installed in the tower section is mounted on the trolley. In an embodiment this is done by first mounting the trolley on the guiderail and subsequently mounting the damper unit on the trolley which has already been mounted on the guiderail. However, in other embodiments, the damper unit is first mounted on the trolley, and subsequently the trolley, with the damper unit mounted thereon, is mounted on the guiderail.

In any event, once the trolley has been mounted on the guiderail and the damper unit has been mounted on the trolley, it is possible to move the trolley, with the damper unit, along the path defined by the guiderail. Accordingly, as a next step, the trolley with the damper unit is moved along the guiderail to a position inside the tower section.

When the damper unit has been moved to the position inside the tower section, by means of the trolley and along the guiderail, the damper unit is positioned in an installation position being vertically offset from the centre axis of the tower section. This includes elevating the damper unit, i.e. lifting the damper unit to a vertical position or level that differs from the vertical position or level in which the damper unit was moved to the position inside the tower section. The step of elevating the damper unit may include elevating at least a part of the trolley, and thereby elevating the damper unit mounted thereon. However, it is not ruled out that the damper unit is elevated without elevating a part of the trolley.

In the present context the term 'installation position' should be interpreted to mean a position inside the tower section where it is intended to have the damper unit installed during operation of the wind turbine. Accordingly, the damper unit is finally attached to the tower section at the installation position.

Thus, in the method according to the first aspect of the invention, the damper unit is moved from the position outside the tower section to the position inside the tower section, in a first vertical position or level, which allows the damper unit to pass the opening defined at the end of the tower section, in particular allowing the damper unit to pass a flange at the end of the tower section. Once positioned inside the tower, the damper unit is positioned at the installation position which is offset from the centre axis, by elevating the damper unit, and attached to the tower section at this installation position.

Since the installation position is offset from the centre axis, attaching the damper unit to the tower section at this position may allow clear passage along the length of the tower, once erected, at the centre of the tower from the bottom to an interface towards the nacelle. It may therefore be desirable to install the damper unit at such a position. However, the offset vertical level of the installation position may prevent the damper unit from being moved from the position outside the tower section to the position inside the tower section, at this vertical level, since this may not allow the damper unit to pass the opening at the end of the tower section, notably a flange arranged at the opening. It is therefore an advantage of the method according to the first aspect of the invention, that the damper unit is moved into the tower section at one vertical level and subsequently positioned at the desired installation position, in the manner described above. Thereby it is ensured that the damper unit can be appropriately introduced into the tower section as well as being appropriately installed in the interior of the tower section.

The step of elevating the damper unit may comprise operating at least one hydraulic cylinder. This is an efficient and reliable manner of performing an elevating movement. Operating the at least one hydraulic cylinder may cause the trolley or a part of the trolley carrying the damper unit to be elevated. In another embodiment, operating the at least one hydraulic cylinder may move the damper unit relative to the trolley, i.e. the damper unit may be elevated without elevating the trolley or a part of the trolley.

The step of elevating the damper unit may comprise operating at least two hydraulic cylinders and monitoring the vertical position of the damper unit and the stroke of each of the at least two hydraulic cylinders so as to ensure coordinated operation of the at least two hydraulic cylinders.

According to this embodiment, the elevation of the damper unit is performed via at least two points of contact between hydraulic cylinders and the damper unit, or a part of the trolley being elevated along with the damper unit. By monitoring the vertical position of the damper unit and the stroke of each of the at least two hydraulic cylinders, and coordinating the operation of the hydraulic cylinders based thereon, it can be ensured that the damper unit is elevated in an appropriate manner, e.g. in such a manner that the orientation of the damper unit is at least substantially maintained, and/or in such a manner that no moving parts are stuck or jammed due to uncoordinated operation of the hydraulic cylinders.

In other embodiments, the elevating movement may be effected by other suitable elevating means, such as pneumatic pistons, linear actuators, electric actuators, etc.

The step of positioning the damper unit may further comprise moving the damper unit in a substantially horizontal direction being transverse to the centre axis of the tower section.

According to this embodiment, in addition to elevating the damper unit to position it in the installation position, the damper unit is also moved in a substantially horizontal direction being transverse to the centre axis of the tower section, and thereby substantially transverse the direction of movement when moving the trolley and the damper unit along the guiderail to the position inside the tower section. This transverse, horizontal movement may be regarded as a sideways movement, and it enables a more precise positioning of the damper unit in the installation position.

Similarly to the elevation, the substantially horizontal movement may be performed by means of at least one hydraulic cylinder, at least one pneumatic cylinder, at least one linear actuator, at least one electric actuator, etc.

The step of positioning the damper unit may further comprise fine tuning the position and/or an inclination of the damper unit. According to this embodiment, the damper unit is positioned very accurately in the installation position.

In the present context, the term 'fine tuning the position and/or inclination' should be interpreted to mean that the damper unit is moved slowly and/or in small increments, so as to avoid high impact collisions between the damper unit and the tower section.

Thus, the fine tuning will allow the damper unit to be precisely positioned, e.g. in order to align holes for receiving mounting bolts applied when attaching the damper unit to the tower section. Since the damper unit is normally very heavy, such fine tuning of the position and/or inclination requires specialised equipment.

The method may further comprise the step of, after moving the trolley with the damper unit along the guiderail to a position inside the tower section, rotating the damper unit about an axis being substantially parallel to a vertical direction. For instance, the damper unit may be rotated approximately 90° about the axis, thereby positioning the damper unit in an orientation being substantially perpendicular to the orientation in which it is moved to the position inside the tower section. This would, e.g., allow the damper unit to be positioned in an installation orientation that would otherwise not allow it to pass through the end of the tower section.

The step of introducing the guiderail into the tower section may comprise the steps of:
- arranging the guiderail with a length direction thereof non-parallel to a horizontal direction,
- introducing the guiderail into the tower section, and
- pivoting the guiderail so as to arrange the length direction thereof substantially parallel to the horizontal direction.

According to this embodiment, when the guiderail is being introduced into the tower section, it is initially arranged with a length direction thereof non-parallel to a horizontal direction, i.e. the length direction of the guiderail is arranged in an inclined manner. In an embodiment, the inclination of the guiderail is such that an end of the guiderail which is arranged above an opposite end of the guiderail is arranged closest to the end of the tower section.

The guiderail is then introduced into the tower section, while being arranged in this inclined manner, i.e. the end being introduced first into the tower section is the end being arranged above the opposite end.

Once the guiderail has been introduced into the tower section in the manner described above, i.e. with part of the guiderail being arranged inside the tower section and part of the guiderail extending out of the tower section, the guiderail is pivoted so as to arrange the length direction thereof substantially parallel to the horizontal direction.

Introducing the guiderail into the tower section in the manner described above allows the end of the guiderail to pass the opening at the end of the tower section, in particular a flange arranged at the opening, while ensuring that the guiderail is substantially horizontal before the trolley is mounted thereon, so as to ensure appropriate movement of the trolley with the damper unit along the guiderail.

The pivoting of the guiderail may, e.g., be performed by appropriately operating one or more hydraulic cylinders.

The method may further comprise the steps of:
- moving the trolley out of the tower section, along the guiderail,
- rotating the tower section approximately 90° about the centre axis of the tower section,
- mounting a second damper unit on the trolley,
- moving the trolley with the second damper unit along the guiderail to a second position inside the tower section,
- positioning the second damper unit in a second installation position being vertically offset from the centre axis of the tower section, wherein the positioning comprises elevating the second damper unit, and
- attaching the second damper unit to the tower section at the second installation position.

According to this embodiment, once the damper unit has been appropriately attached to the tower section at the installation position, the trolley is moved out of the tower section, along the guiderail. Subsequently, the tower section is rotated approximately 90° about the centre axis of the tower section, i.e. about the axis defining cylindrical symmetry for the tower section. This causes the damping unit which has already been installed in the tower section to move along in this rotational movement, thereby changing the orientation of this damper unit by approximately 90°.

A second damper unit is then mounted on the trolley, and the steps described above are essentially repeated, so as to cause the second damper unit to be installed at a second installation position inside the tower section, essentially in the same manner as the first damper unit, i.e. the damper unit which has already been installed. However, due to the rotation of the tower section prior to installing the second damper unit, the second damper is installed in an orientation which is substantially perpendicular to the orientation of the first damper unit. This embodiment is particularly suitable for unidirectional dampers, for example a pendulum damper, where the pendulum is swinging in one plane. With this installation, the first and second damper units are optimised for handling oscillations along two substantially perpendicular directions, and the combination of the first and second damper units is therefore able to handle oscillations along any direction.

The second installation position may be displaced along the centre axis of the tower section, relative to the first installation position. In this case the first damper unit and the second damper unit will be arranged at separate vertical levels inside the wind turbine tower once the wind turbine tower has been erected.

The method may further comprise retrieving the guiderail from the tower section before rotating the tower section about its centre axis, and reintroducing the guiderail in the tower section after the rotation has been completed. This would efficiently ensure that no collisions occur between the guiderail and the tower section during the rotation. However, it is not ruled out that the guiderail remains inside the tower section during the rotation, as long as the guiderail is positioned in such a manner that collisions are avoided, and the tower section is allowed to perform the rotation.

According to a second aspect the invention provides an installation kit for installing a damper unit in a tower section of a wind turbine tower, the installation kit comprising:
- a guiderail comprising an interface for receiving a movable trolley, and
- a trolley configured to be movably mounted at the interface of the guiderail, so as to enable the trolley to move along the guiderail, the trolley comprising a mounting cradle for receiving a damper unit, wherein the trolley comprises elevating means for elevating the mounting cradle relative to the rest of the trolley.

The installation kit according to the second aspect of the invention is suitable for performing the method according to the first aspect of the invention. The remarks set forth above with reference to the first aspect of the invention are therefore equally applicable here.

Thus, the installation kit comprises a guiderail and a trolley as described above with reference to the first aspect of the invention. In particular, the guiderail comprises an interface for receiving a movable trolley, the trolley is configured to be mounted on the interface and to move along the guiderail, and the trolley comprises a mounting cradle for receiving a damper unit, thereby allowing a damper unit to be mounted on the trolley, in the manner described above with reference to the first aspect of the invention.

Furthermore, the trolley comprises elevating means for elevating the mounting cradle relative to the rest of the trolley. This allows a damper unit mounted in the mounting cradle to be elevated to reach the installation position, in the manner described above with reference to the first aspect of the invention.

The elevating means may comprise at least one hydraulic cylinder. This has already been described above with reference to the first aspect of the invention.

The trolley may further comprise means for moving the mounting cradle relative to the rest of the trolley in a substantially horizontal direction being transverse to a length direction of the guiderail, and the means for moving the mounting cradle in a substantially horizontal direction may comprise at least one electric, pneumatic or hydraulic linear actuator. This allows a substantially transverse movement of a damper unit mounted in the mounting cradle, and has already been described above with reference to the first aspect of the invention.

The trolley may further comprise means for fine tuning a position and/or an inclination of the mounting cradle relative to the rest of the trolley. This allows similar fine tuning of a position and/or an inclination of a damper unit mounted in the mounting cradle, as described above with reference to the first aspect of the invention.

The means for fine tuning may comprise one or more hydraulic cylinders, and may, e.g., be in the form of low height, short stroke type cylinder.

The guiderail may comprise at least two detachable segments. According to this embodiment, the guiderail may be transported to the site where the damper unit is supposed to be installed in the tower section in a detached configuration, i.e. with the at least two segments detached from each other. This allows easy handling of the guiderail during transport, without requiring specially designed transport vehicles. Once the segments of the guiderail have reached the installation site, they may be assembled to form the guiderail, and the kit is used for installing the at least one damper unit in the tower section, in the manner described above with reference to the first aspect of the invention.

When the installation of the at least one damper unit in the tower section has been completed, the guiderail may be disassembled, i.e. the at least two segments may be detached from each other, in order to allow easy handling of the guiderail during transport away from the site.

The installation kit may further comprise at least one hydraulic jack for supporting the guiderail and for adjusting an inclination of a length direction of the guiderail. This will allow the guiderail to be positioned in a substantially horizontal orientation before a trolley carrying a damper unit is moved along the guiderail. Furthermore, the at least one hydraulic jack may be applied for allowing the guiderail to be introduced into the tower section with an inclined orientation, as described above with reference to the first aspect of the invention.

BRIEF DESCRIPTION OF THE DRAWINGS

The invention will now be described in further detail with reference to the accompanying drawings in which.

DETAILED DESCRIPTION

Figure 1:
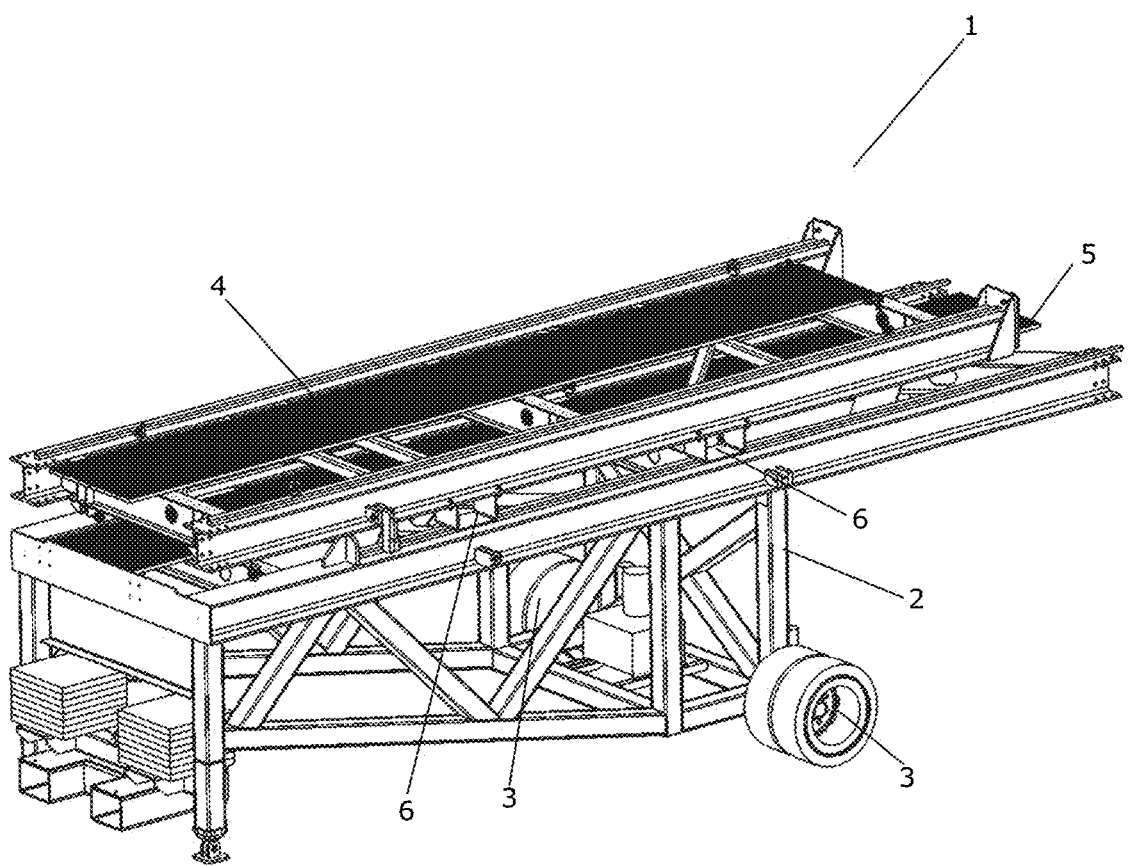
FIG. 1 is a perspective view of a guiderail for an installation kit according to an embodiment of the invention.

FIG. 1 is a perspective view of a guiderail 1 for an installation kit according to an embodiment of the invention. The guiderail 1 comprises a frame 2 provided with wheels 3 allowing the guiderail 1 to be moved along a surface, such as the ground. The guiderail 1 further comprises an interface 4 for receiving a movable trolley, in such a manner that the trolley is able to move along the interface 4 of the guiderail 1.

The guiderail 1 is of a kind which comprise two or more detachable segments, and in FIG. 1 only one segment is shown. Further segments can be attached to an end portion 5 of the interface 4, so as to form a longer interface 4 along which a trolley can move. During transport of the guiderail 1, such additional segments may be arranged on top of the interface 4.

The guiderail 1 is further provided with forklift pockets 6, allowing the guiderail 1 to be manipulated by means of a forklift, e.g. in order to introduce the guiderail 1 into a tower section.

Figure 2:
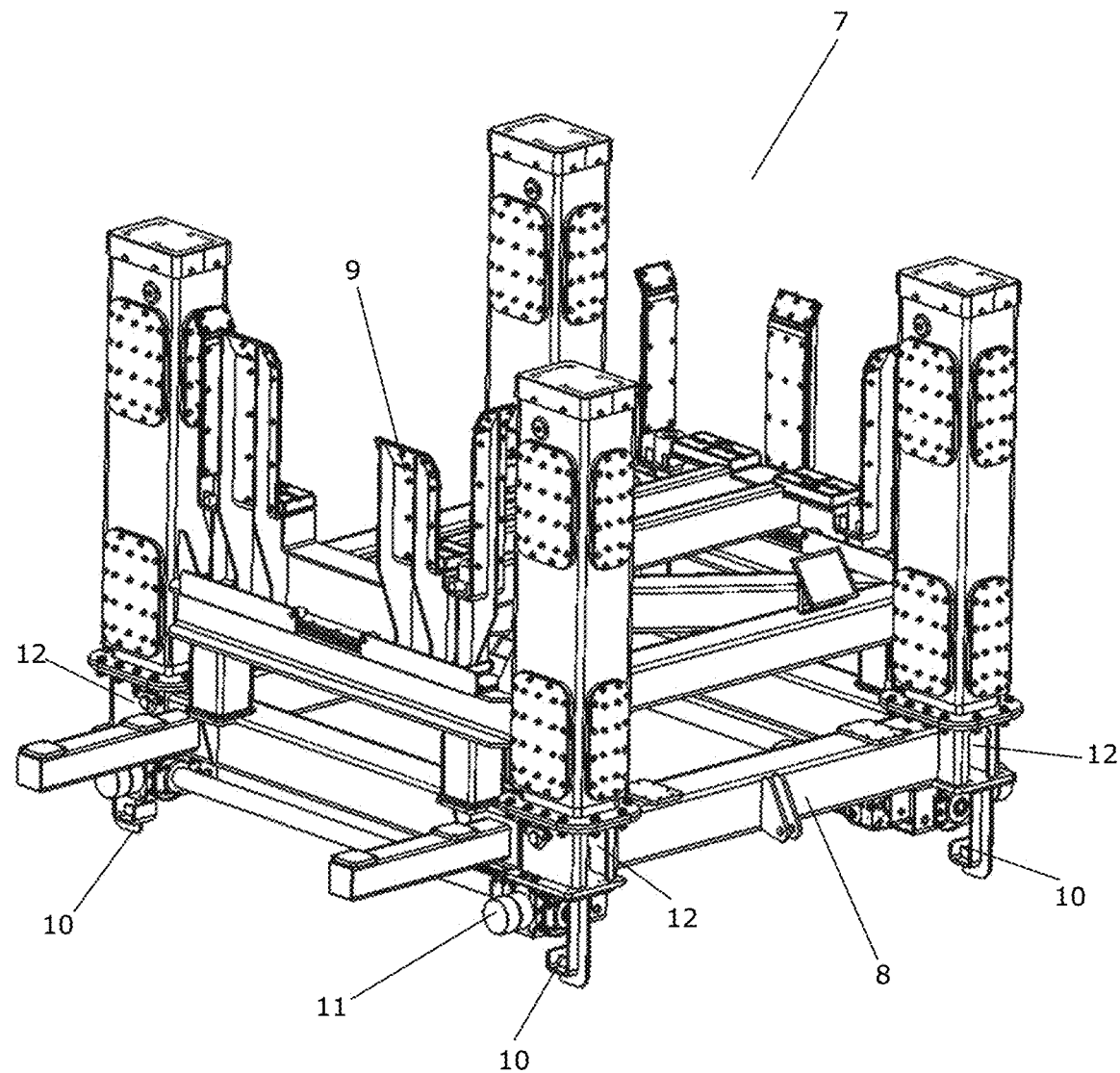
FIGS. 2-4 illustrate a trolley for an installation kit according to an embodiment of the invention.
Figure 3:
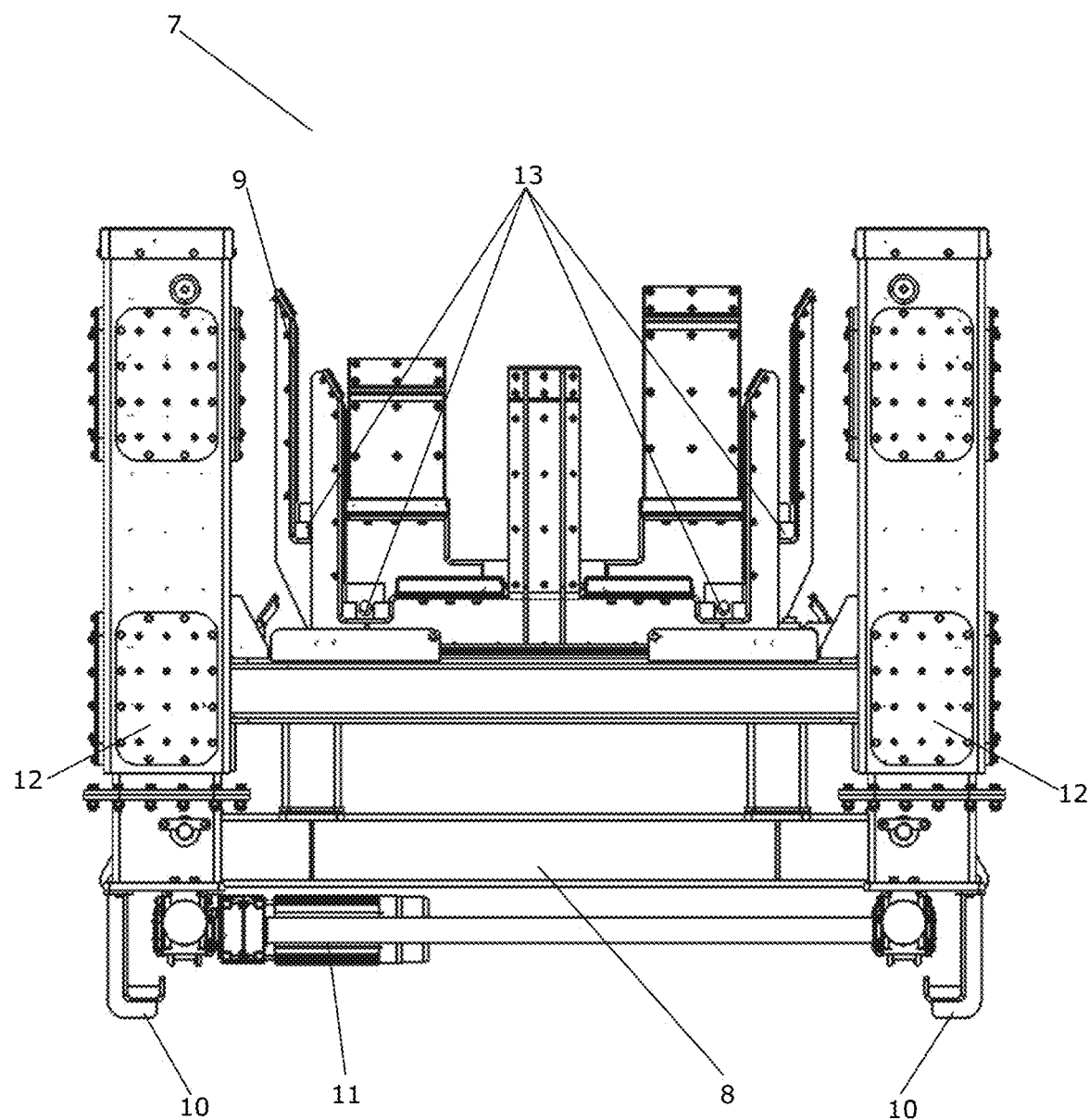
Figure 4:
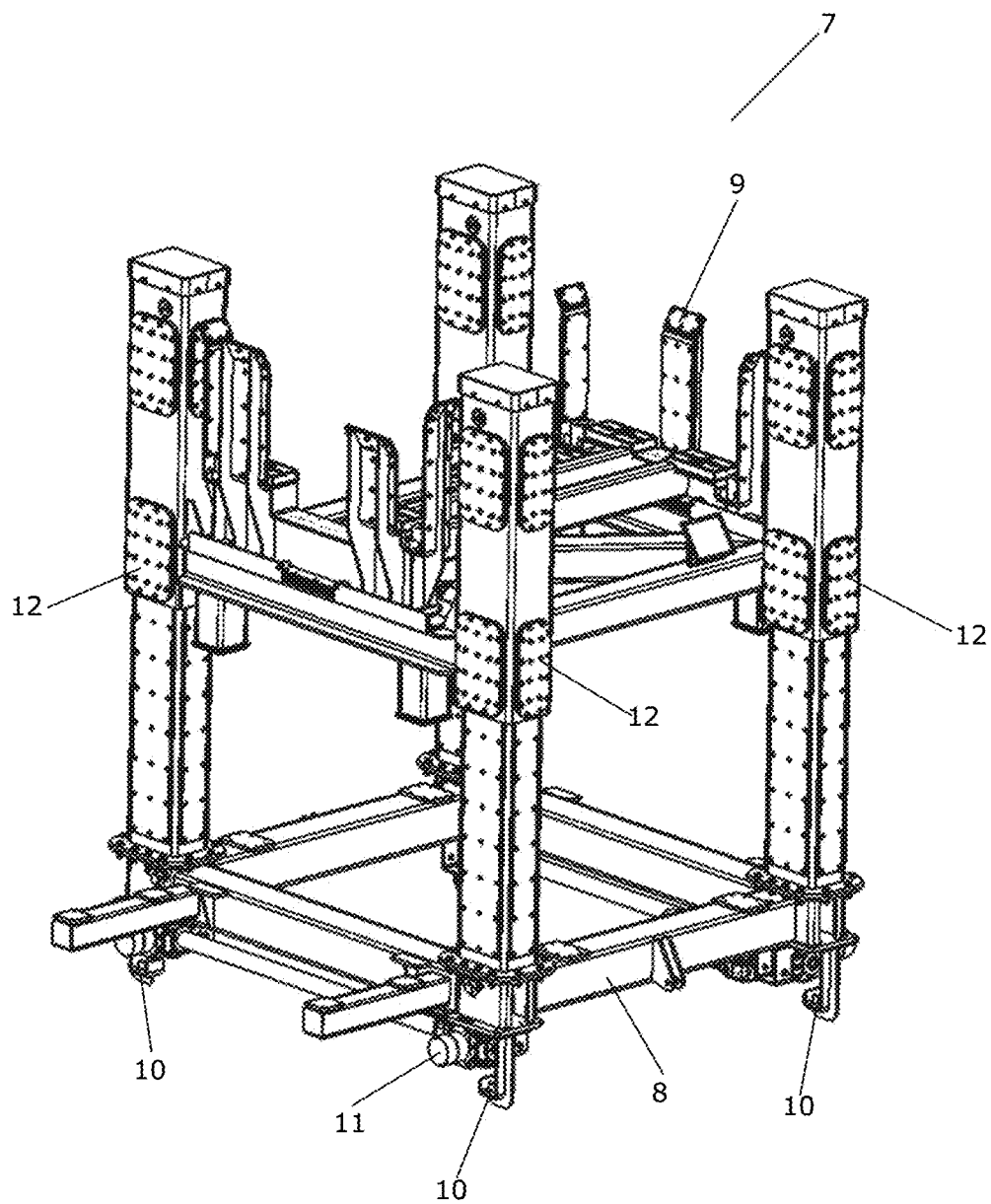

FIGS. 2-4 illustrate a trolley 7 for an installation kit according to an embodiment of the invention. The trolley 7 is configured to move along a guiderail, e.g. the guiderail 1 of FIG. 1. FIGS. 2 and 4 are perspective views of the trolley 7, while FIG. 3 is a sideview of the trolley 7.

The trolley 7 comprises a lower frame 8 and a mounting cradle 9, and the mounting cradle 9 is movable relative to the lower frame 8 in a substantially vertical direction. The mounting cradle 9 is configured to receive a damper unit to be installed in a tower section using the installation kit. FIGS. 2 and 3 show the trolley 7 with the mounting cradle 9 in a lowermost position relative to the lower frame 8, and FIG. 4 shows the trolley 7 with the mounting cradle 9 in an elevated position.

The lower frame 8 is provided with engagement portions 10 configured to clamp an interface of a guiderail, and a drive unit 11 configured to cause the trolley 7 to move along a guiderail, in a manner similar to the movement of a gantry crane.

Hydraulic lifting cylinders 12 are arranged in each of the four corners of the trolley 7. Coordinated operation of the hydraulic cylinders 12 causes the mounting cradle 9 to be elevated relative to the lower frame 8, i.e. the mounting cradle 9 is moved from the position illustrated in FIGS. 2 and 3 to the position illustrated in FIG. 4. Due to the coordinated operation, the orientation of the mounting cradle 9 is maintained as substantially horizontal, while avoiding that the mounting cradle 9 is stuck relative to the lower frame 8.

The trolley 7 is further provided with four hydraulic stroke cylinders 13 for providing fine tuning of the position and/or the inclination of the mounting cradle 9.

FIGS. 5-10 illustrate a method for installing a damper unit 14 in a tower section 15 of a wind turbine tower according to an embodiment of the invention, and using an installation kit comprising the guiderail 1 of FIG. 1 and the trolley 7 of FIGS. 2-4.

Figure 5:
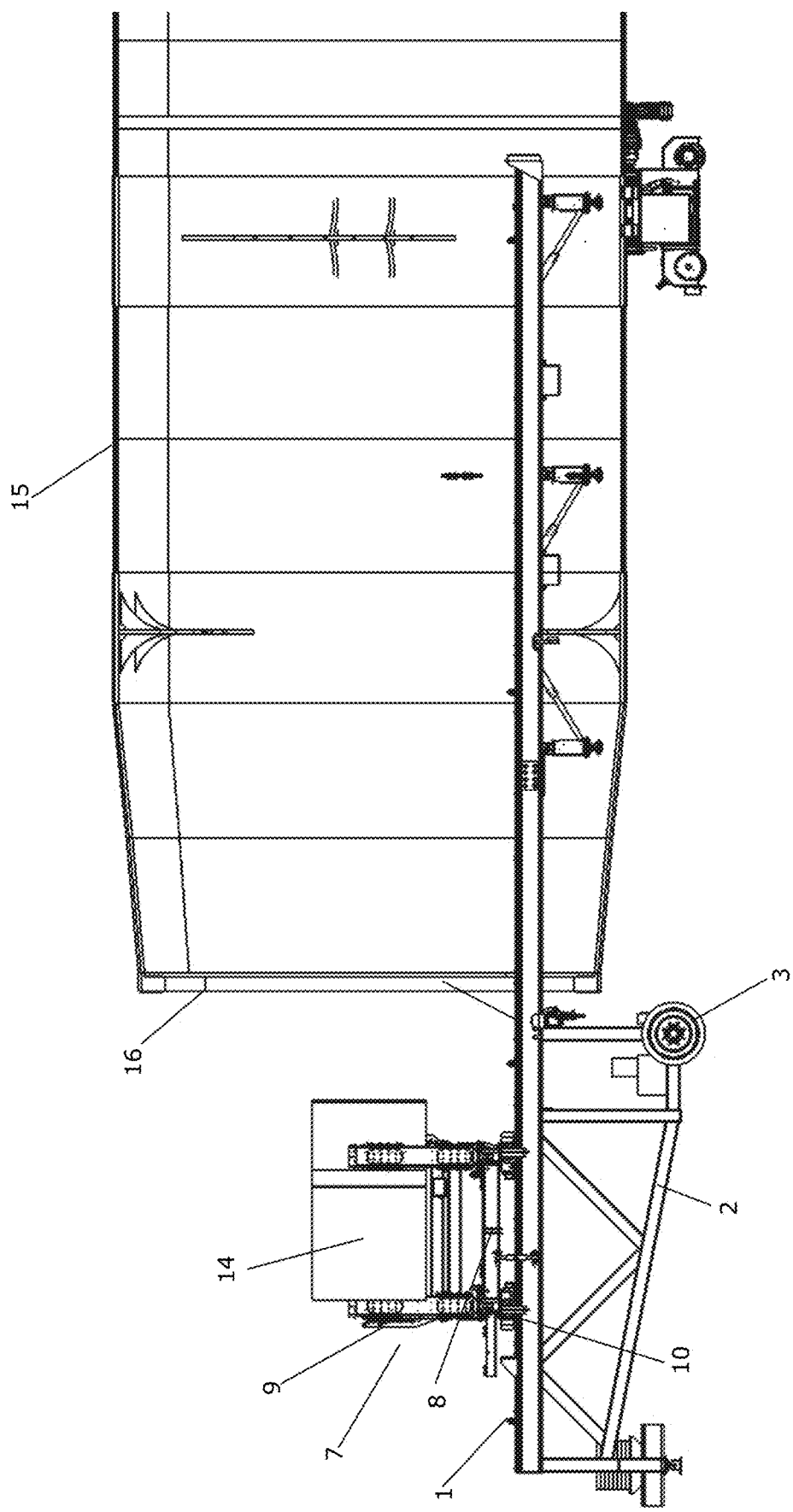
FIGS. 5-10 illustrate a method for installing a damper unit according to an embodiment of the invention.

In FIG. 5, the guiderail 1 has been introduced into the tower section 15, via an end 16 of the tower section 15, in such a manner that part of the guiderail 1 is arranged inside the tower section 15 and part of the guiderail 1 extends out of the tower section 15. Furthermore, the trolley 7 has been mounted on the interface 4 of the guiderail 1, at a position outside the tower section 15, and the damper unit 14 has been mounted on the mounting cradle 9 of the trolley 7.

Figure 6:
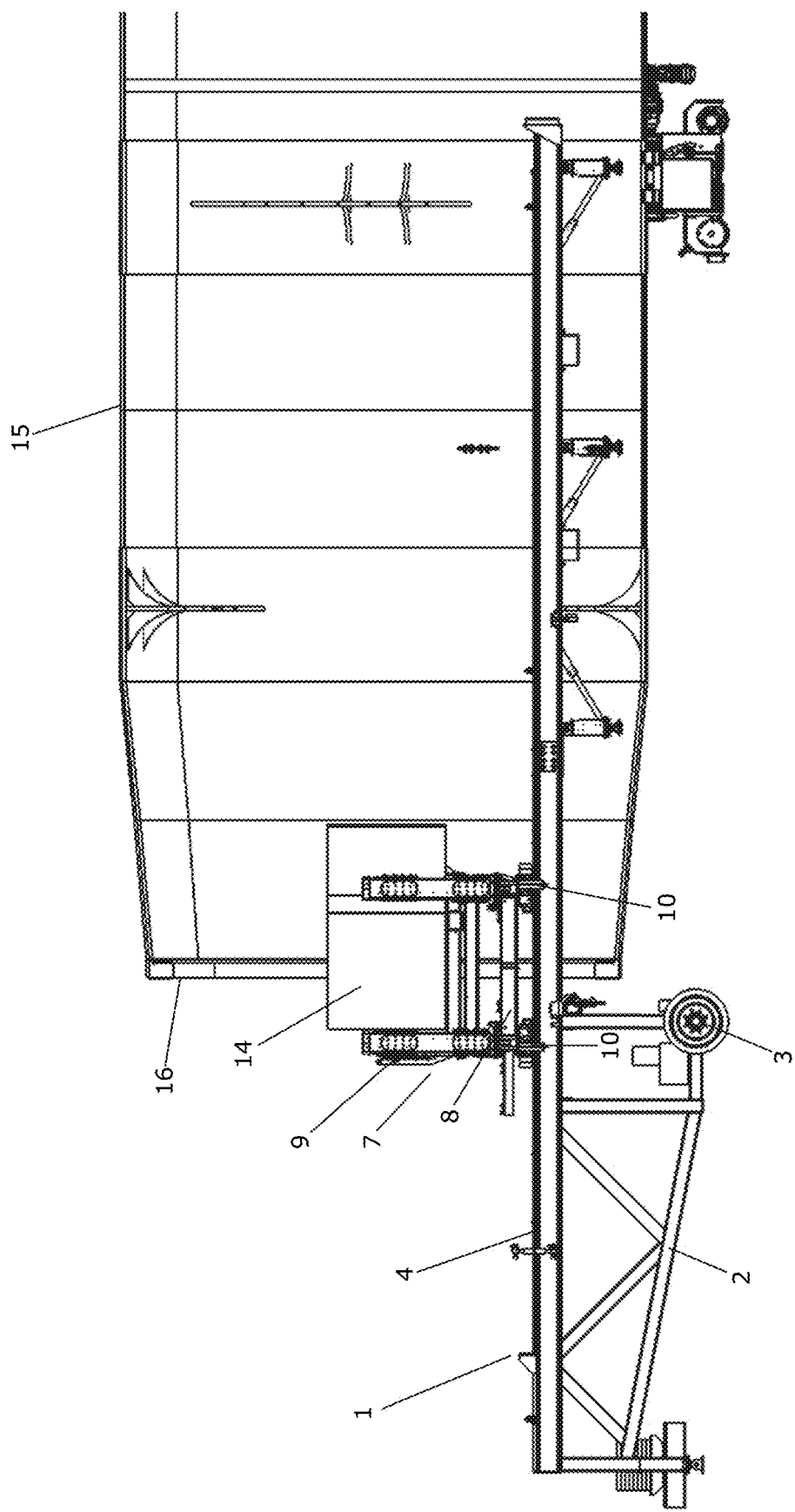
Figure 7:
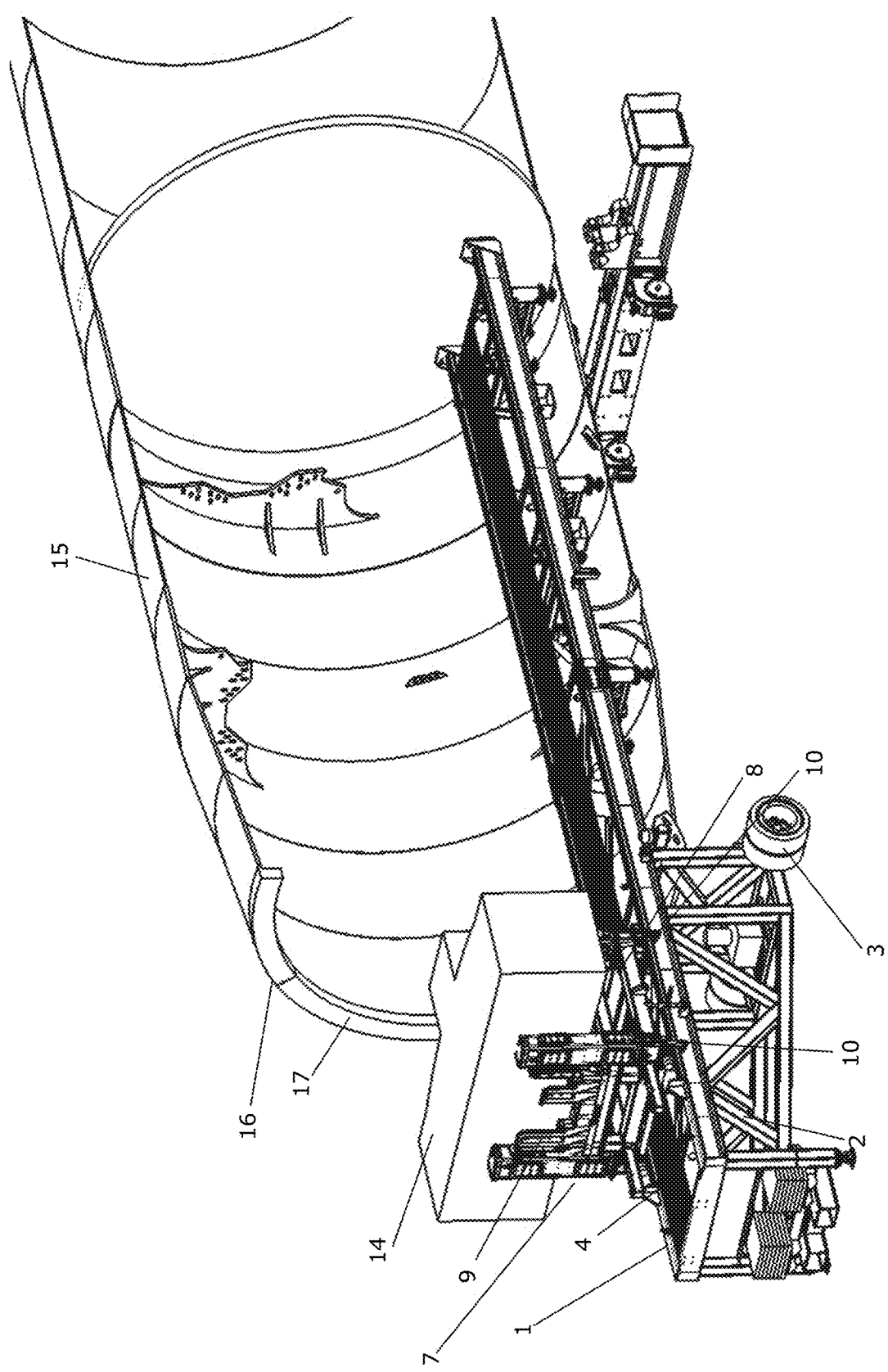

In FIG. 6, the trolley 7, carrying the damper unit 14, is in the process of moving into the tower section 15, via the end 16 and along the guiderail 1. More particularly, the trolley 7 is in the process of passing through an opening formed at the end 16 of the tower section 15. FIG. 7 is a perspective view corresponding to the illustration of FIG. 6, where a part of the tower section 15 has been omitted for the sake of clarity. It can be seen that a flange 17 is arranged at the end 16 of the tower section 15.

Figure 8:
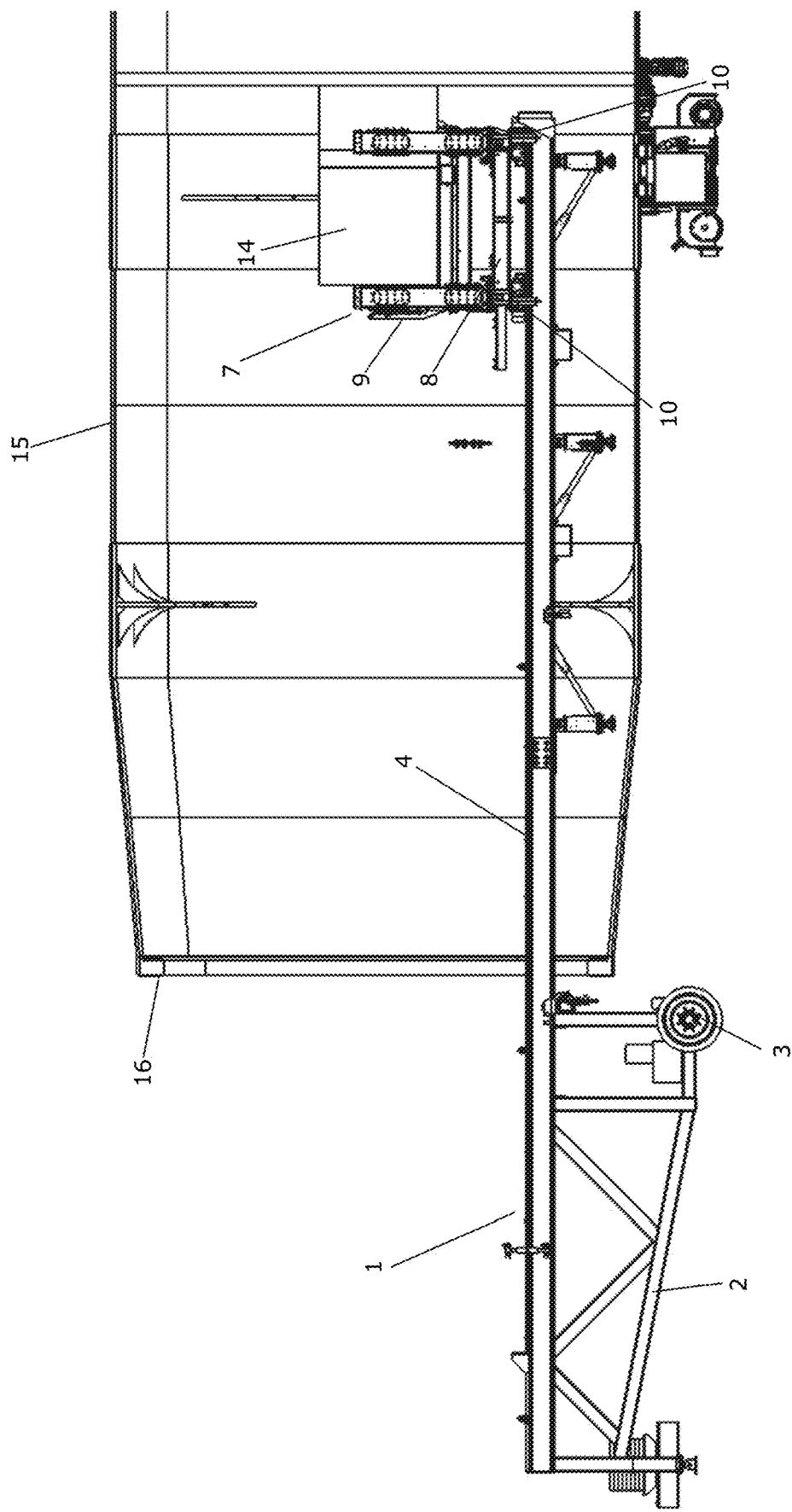
Figure 9:
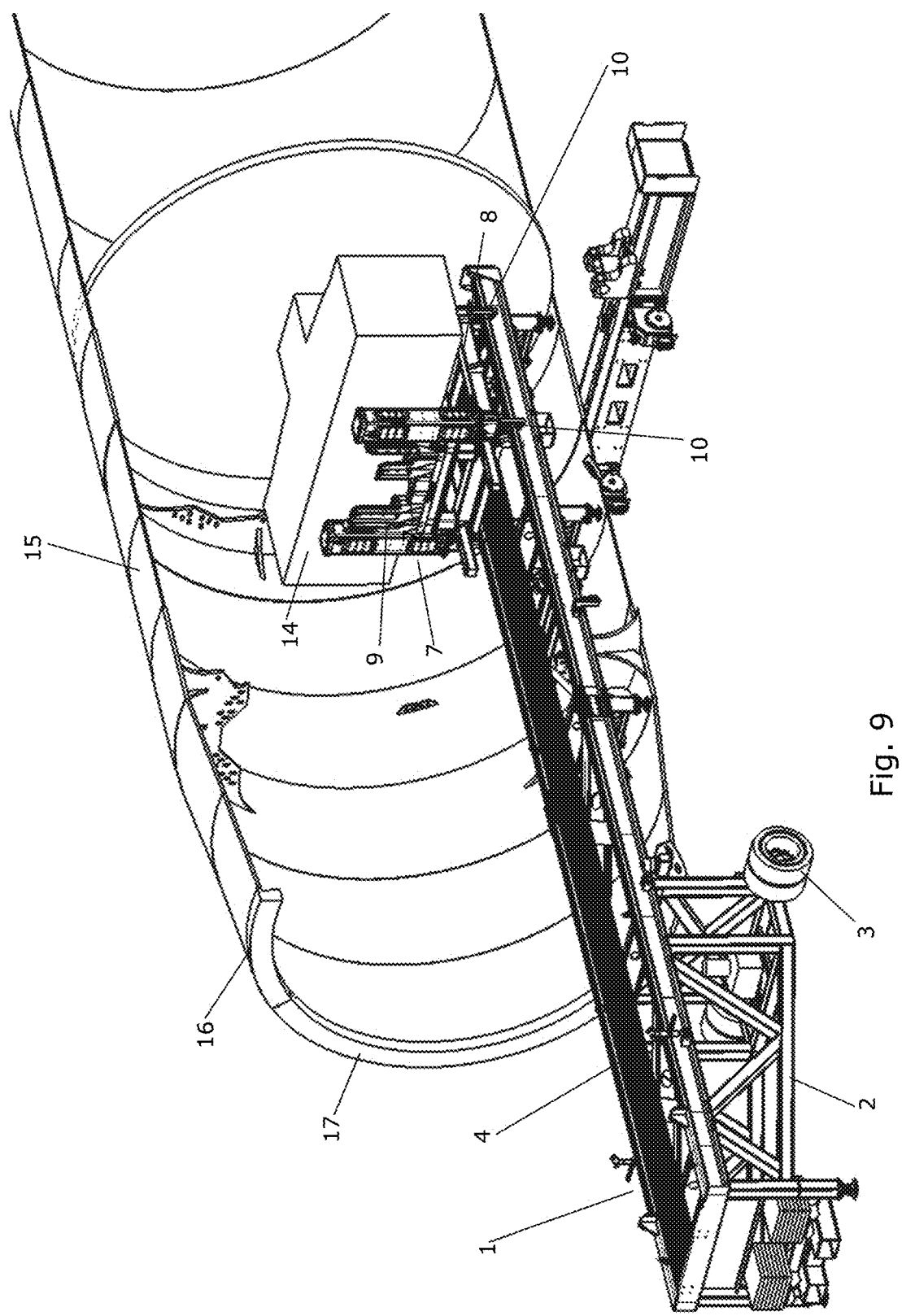

In FIG. 8 the movement of the trolley 7 into the tower section 15 has been completed, and the trolley 7, carrying the damper unit 14, has reached a desired position inside the tower section 15. FIG. 9 is a perspective view corresponding to the illustration of FIG. 8, where a part of the tower section 15 has been omitted for the sake of clarity.

Figure 10:
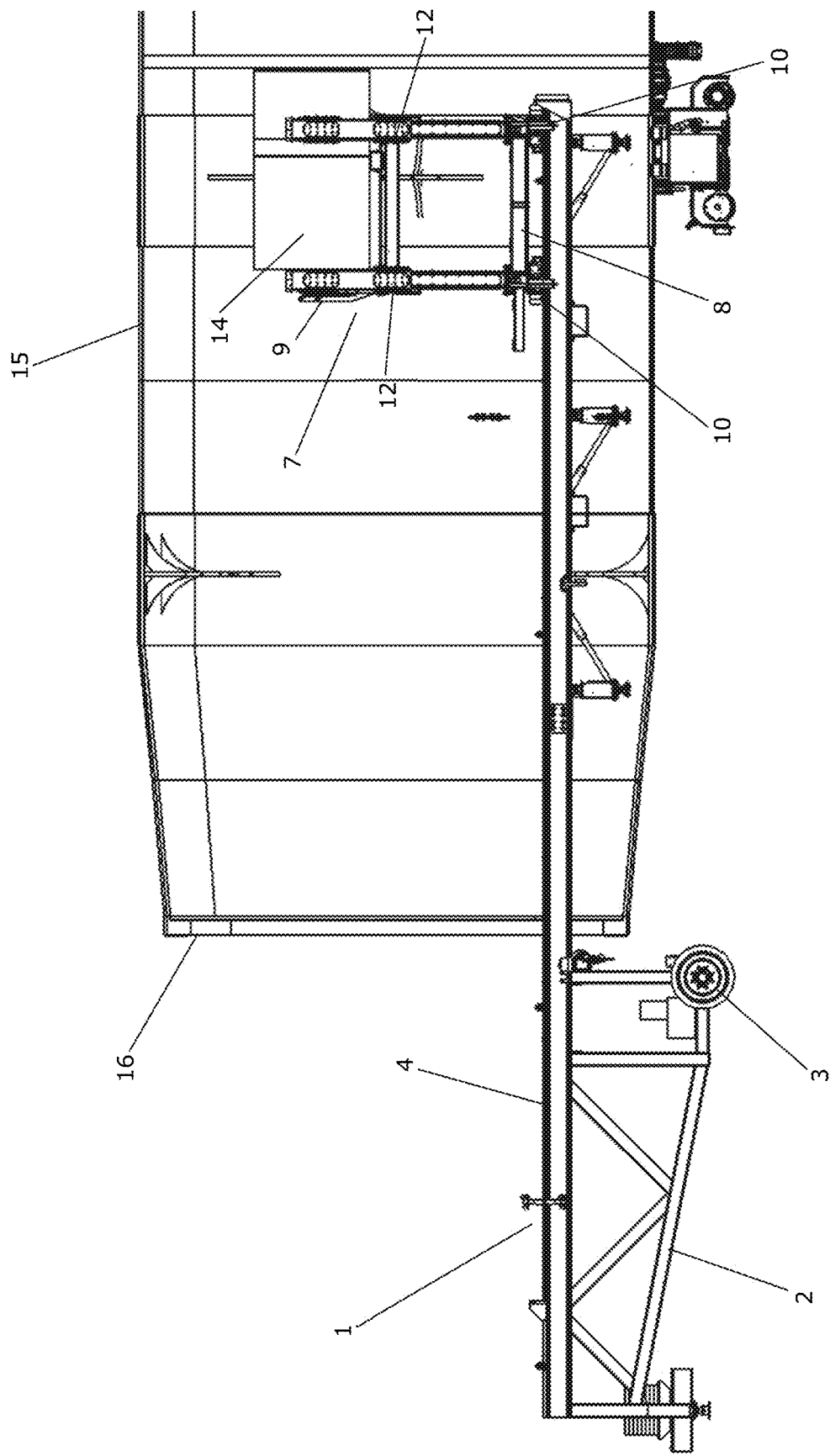

In FIG. 10, the mounting cradle 9, carrying the damper unit 14, has been elevated relative to the lower frame 8 to position the damper unit 14 in an installation position being offset from a centre axis of the tower section 15. This is done by appropriately operating the hydraulic cylinders 12 in a coordinated manner, so as to substantially maintain the orientation of the damper unit 14, i.e. the mounting cradle 9 has been brought to the position illustrated in FIG. 4. Thus, the damper unit 14 is now ready for being attached to the tower section 15 at the installation position.

In an embodiment, the damper unit 14 may be in a first orientation when outside the tower section 15 and moveable to a second orientation when positioned inside the tower section 15. By way of example, the first orientation may be an orientation that facilitates the insertion of the damper unit 14 through the end 16 of the tower section 15, and the second orientation may be an orientation to facilitates the connection of the damper unit 14 in the installation position. This may be achieved, for example, by incorporating a turn table (not shown) in the trolley 7 that carries the damper unit 14. In this regard, a turn table may be incorporated into the trolley 7 between the lower frame 8 and the mounting cradle 9. The turn table may include a drive unit (not shown) for rotating the turn table about a rotational axis that is substantially parallel to a vertical direction. By activating the drive unit, which may be a drive motor, hydraulic unit, or other actuator, the turn table rotates about the rotational axis thereby changing the orientation of the damper unit 14 within the tower section 15. For example, the drive unit may be configured to rotate the turn table through a rotation of approximately 90°. However, the drive unit may be configured to rotate the turn table through other angles, greater or less than approximately 90°. The rotation of the turn table, and therefore the damper unit 14, may be before or after elevating the damper unit.

FIGS. 11-14 illustrate introduction of a guiderail 1 into a tower section 15 as part of a method according to an embodiment of the invention. The guiderail 1 could, e.g., be the guiderail 1 illustrated in FIGS. 1 and 5-10.

Figure 11:
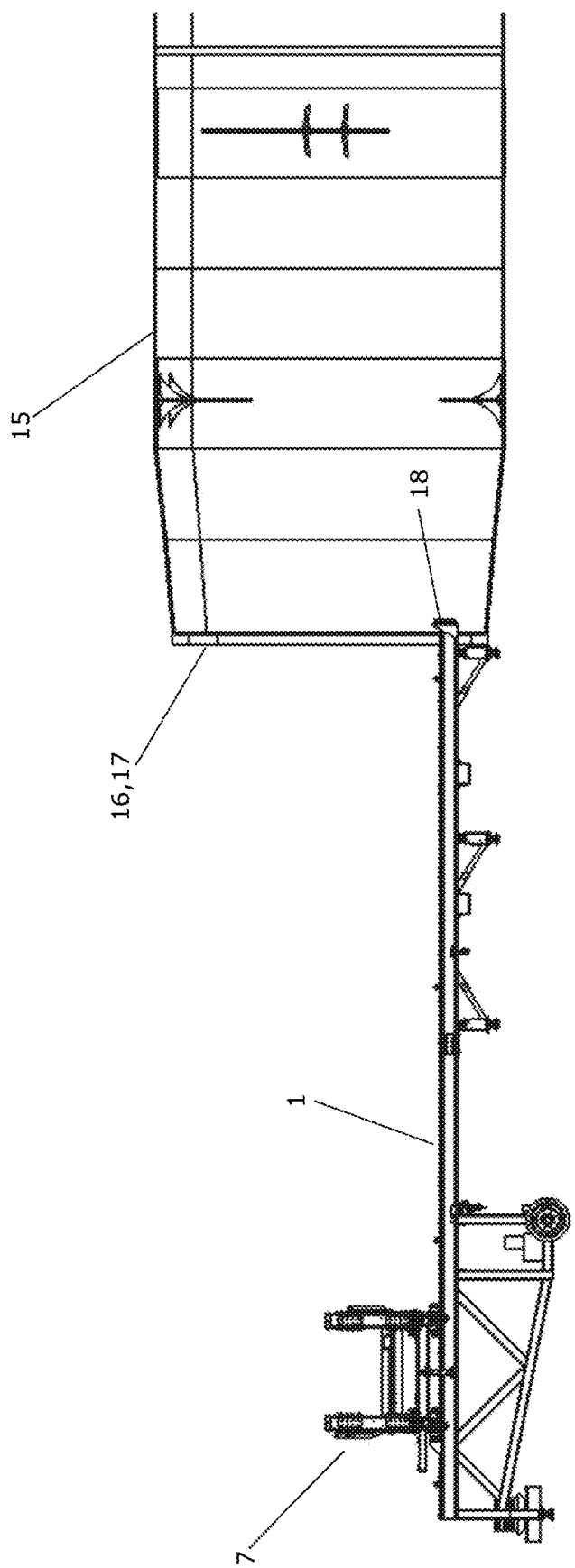
FIGS. 11-14 illustrate introduction of a guiderail into a tower section as part of a method according to an embodiment of the invention.
Figure 12:
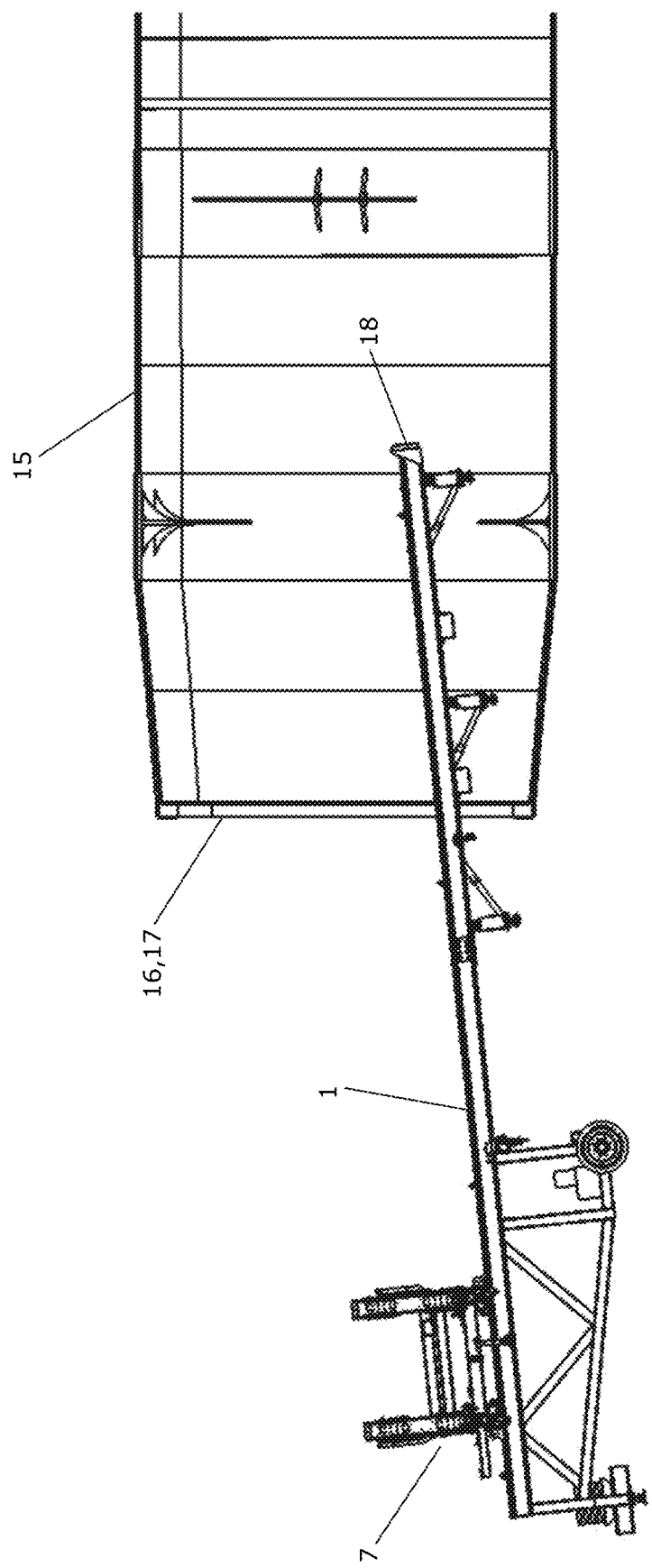

In FIG. 11, the guiderail 1, with a trolley 7 mounted thereon, is positioned essentially outside the tower section 15. In FIG. 12, the guiderail 1 has been arranged in an inclined position, in the sense that a length direction thereof is arranged non-parallel to a horizontal direction, and a distal end 18 of the guiderail 1 has been lifted. Furthermore, the guiderail 1 is in the process of being introduced into the tower section 15, in this inclined position. The inclined position allows the distal end 18 of the guiderail 1 to pass into the tower section 15, in particular past the flange 17 at the end of the tower section 15, without collisions between the guiderail 1 and the tower section 15.

Figure 13:
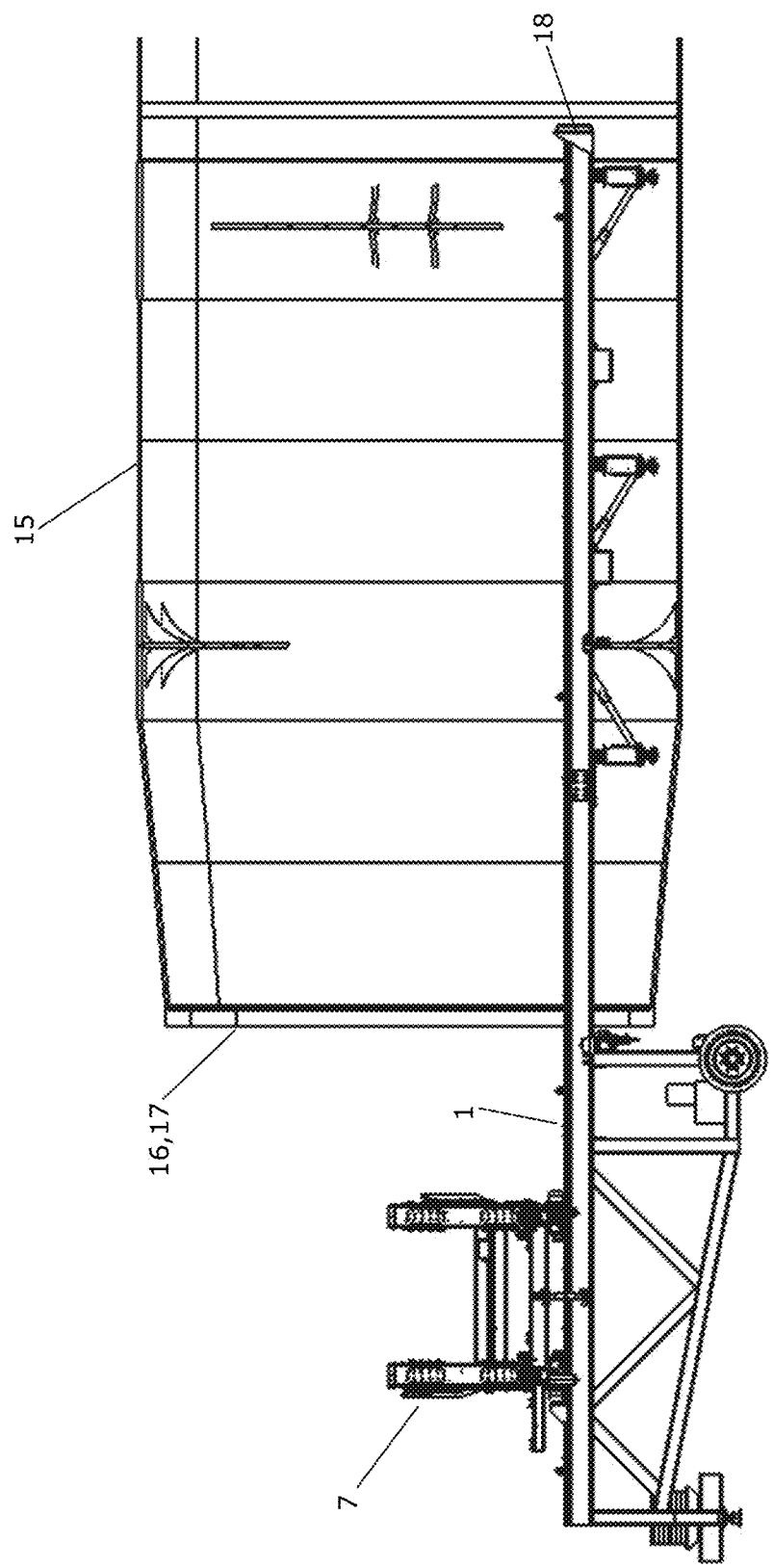

In FIG. 13, the guiderail 1 has been completely introduced into the tower section 15, and it has been pivoted so as to arrange the length direction of the guiderail 1 substantially parallel to the horizontal direction.

Figure 14:
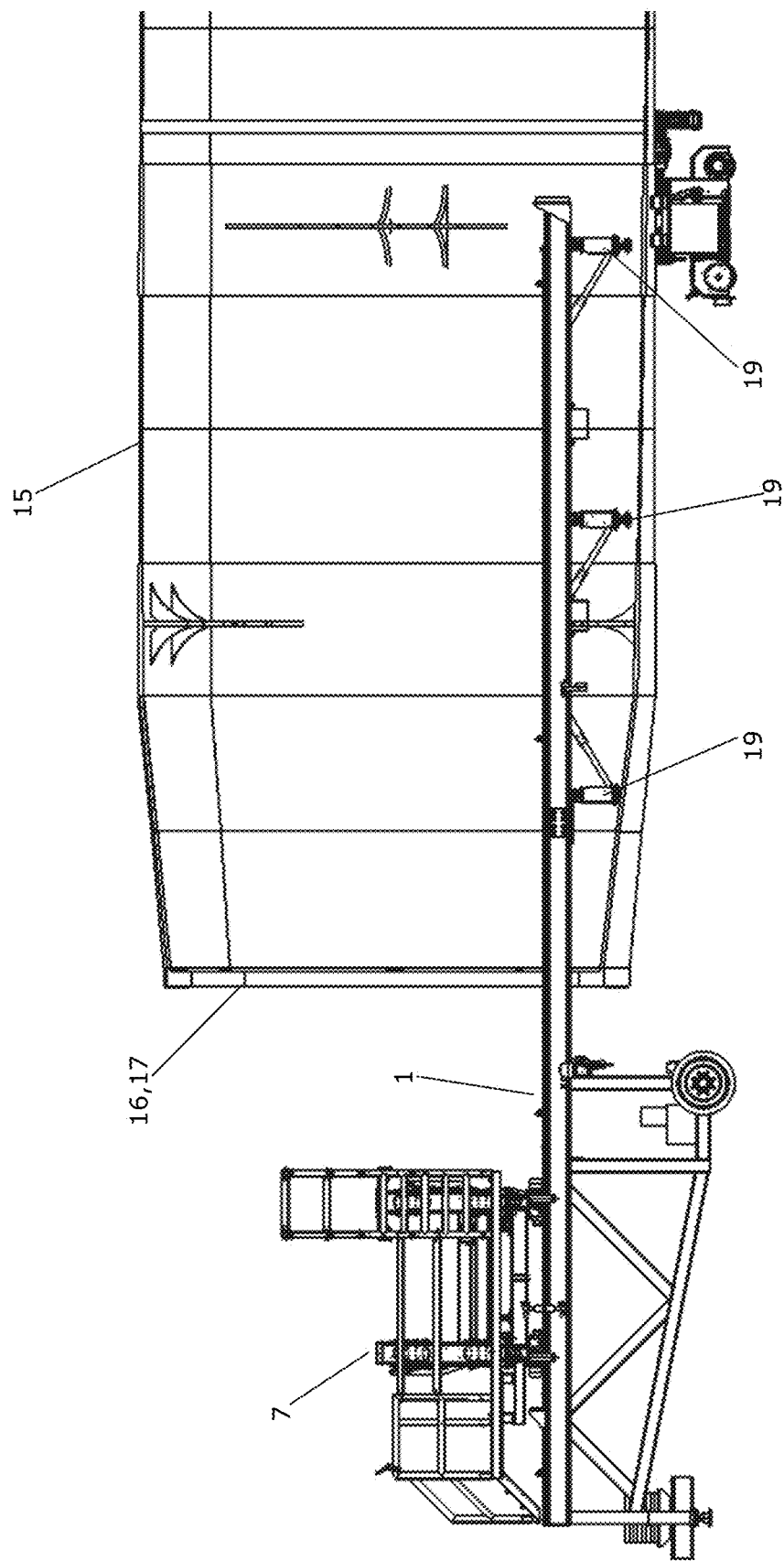

In FIG. 14, the guiderail 1 has further been levelled to accurately arrange it along the horizontal direction. This is done by moving levelling legs 19 into contact with the wall of the tower section 15. Accordingly, the guiderail 1 is now ready to allow the trolley 7 to move along the guiderail 1 in the manner described above with reference to FIGS. 5-10.

FIGS. 15-18 illustrate a method for installing a second damper unit 14 according to an embodiment of the invention. The method steps illustrated in FIGS. 15-18 may, e.g., be performed subsequently to the method steps illustrated in FIGS. 5-10.

Figure 15:
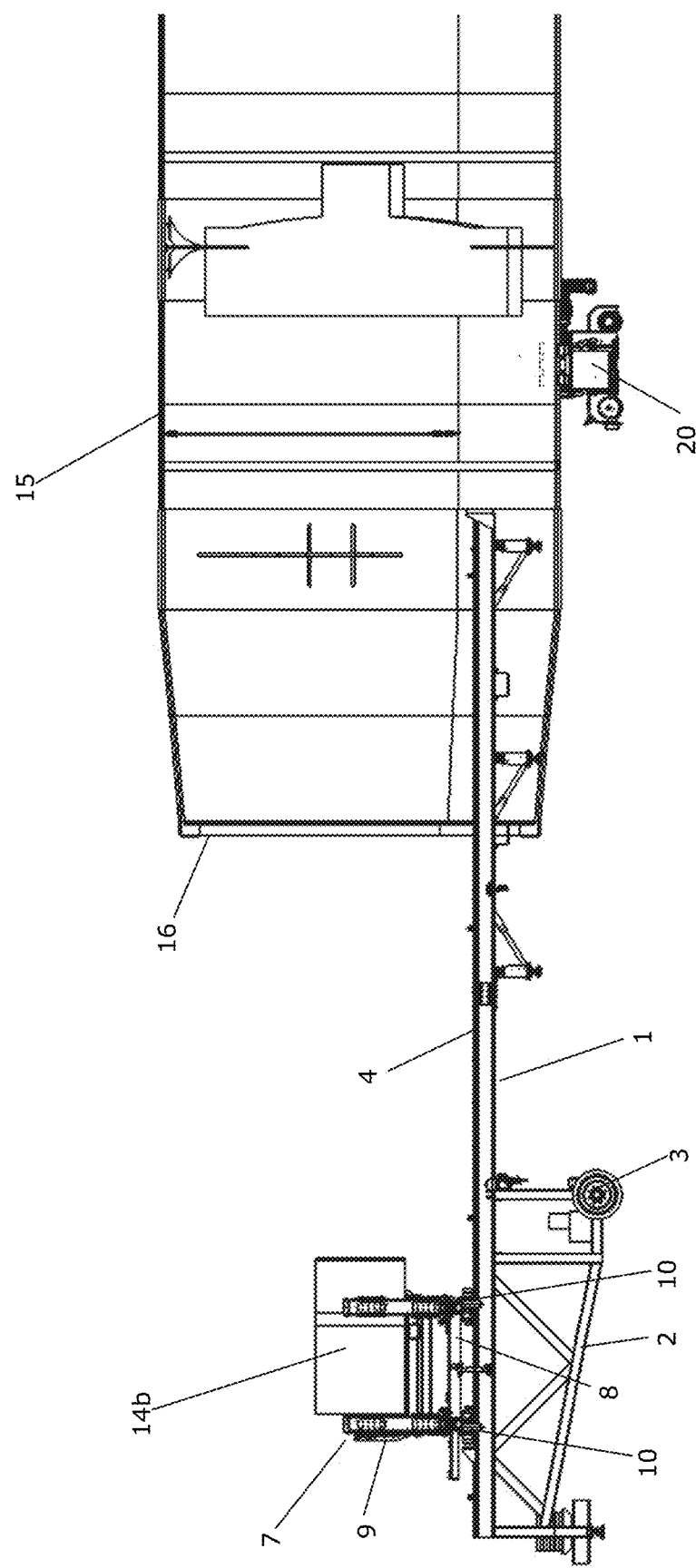
FIGS. 15-18 illustrate a method for installing a second damper unit according to an embodiment of the invention.

In FIG. 15, following the installation of a first damper unit 14a, e.g. in the manner described above with reference to FIGS. 5-10, the trolley 7 has been moved out of the tower section 15, and the tower section 15 has been rotated approximately 90° about the centre axis of the tower section 15. The rotation of the tower section 15 has been performed by means of rotating tool 20. A second damper unit 14b has been mounted on the trolley 7, and is thereby ready to be installed in the tower section 15, essentially in the same manner as the first damper unit 14a, i.e. essentially as described above with reference to FIGS. 5-10.

Figure 16:
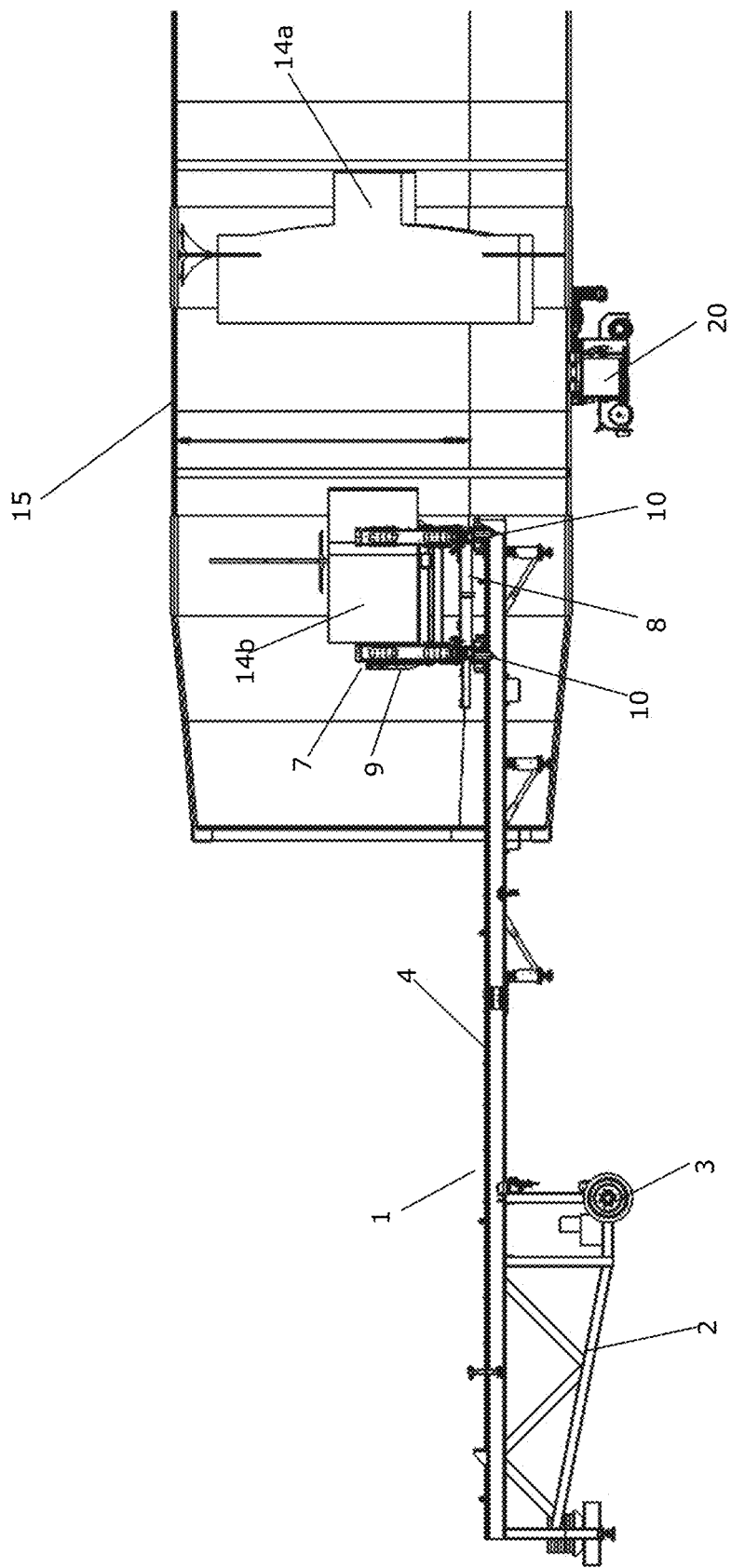
Figure 17:
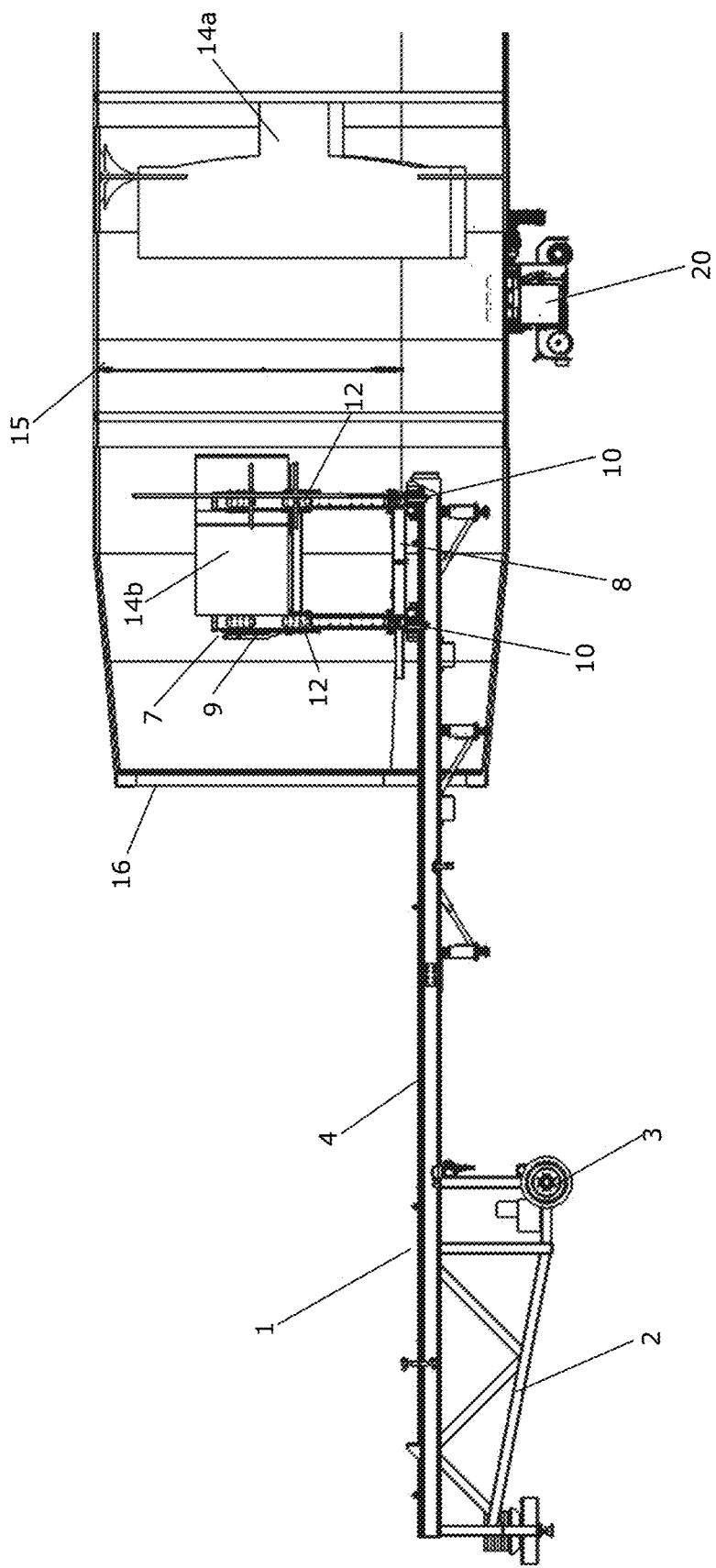
Figure 18:
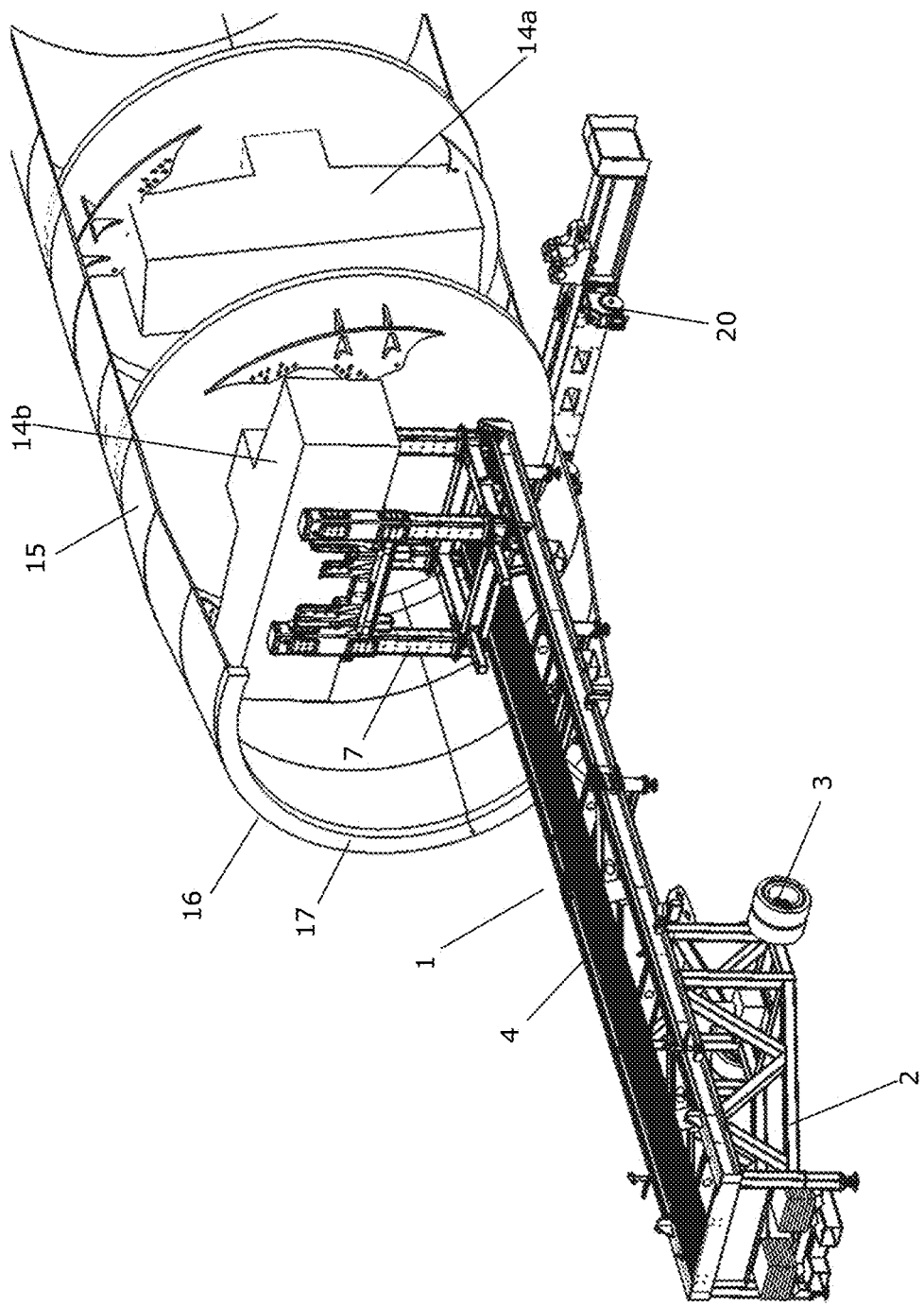

In FIG. 16, the trolley 7, carrying the second damper unit 14b, has been moved along the guiderail 1 to a position inside the tower section 15, and in FIG. 17, the second damper unit 14b has been elevated to an installing position being vertically offset from the centre axis of the tower section 15, and is in the process of being attached to the tower section 15 at this position. FIG. 18 is a perspective view corresponding to FIG. 17.

It can be seen that the second damper unit 14b is oriented in such a manner that it is rotated substantially 90° about the centre axis of the tower section 15 with respect to the first damper unit 14a. This allows the first damper unit 14a to handle vibrations along a first direction while the second damper unit 14b handles vibrations along a second direction being perpendicular to the first direction. Accordingly, the first damper unit 14a and the second damper unit 14b, in combination, are able to handle vibrations along any direction being perpendicular to the centre axis of the tower section 15.

What is claimed is:

1. A method for installing at least one damper unit in a tower section of a wind turbine tower, the tower section having a centre axis extending in a longitudinal direction of the tower section, the method comprising the steps of:
    arranging the tower section so that the centre axis is in a substantially horizontal orientation,
    introducing a guiderail into the tower section, via an end of the tower section, in such a manner that part of the guiderail is arranged inside the tower section and part of the guiderail extends out of the tower section,
    mounting a trolley on a part of the guiderail extending out of the tower section, and mounting the damper unit on the trolley,
    moving the trolley with the damper unit along the guiderail to a position inside the tower section,
    positioning the damper unit in an installation position being vertically offset from the centre axis of the tower section, wherein the positioning comprises elevating the damper unit while the damper unit is positioned inside the tower section, and
    attaching the damper unit to the tower section at the installation position.

2. The method according to claim 1, wherein the step of elevating the damper unit comprises operating at least one hydraulic cylinder.

3. The method according to claim 2, wherein the step of elevating the damper unit comprises operating at least two hydraulic cylinders and monitoring the vertical position of the damper unit and the stroke of each of the at least two hydraulic cylinders so as to ensure coordinated operation of the at least two hydraulic cylinders.

4. The method according to claim 1, wherein the step of positioning the damper unit further comprises moving the damper unit in a substantially horizontal direction being transverse to the centre axis of the tower section.

5. The method according to claim 1, wherein the step of positioning the damper unit further comprises fine tuning the position and/or an inclination of the damper unit.

6. The method according to claim 1, further comprising the step of, after moving the trolley with the damper unit along the guiderail to a position inside the tower section, rotating the damper unit about an axis being substantially parallel to a vertical direction.

7. The method according to claim 1, wherein the step of introducing the guiderail into the tower section comprises the steps of:
arranging the guiderail with a length direction thereof non-parallel to a horizontal direction,
introducing the guiderail into the tower section, and
pivoting the guiderail so as to arrange the length direction thereof substantially parallel to the horizontal direction.

8. The method according to claim 1, further comprising the steps of:
moving the trolley out of the tower section, along the guiderail,
rotating the tower section approximately 90° about the centre axis of the tower section,
mounting a second damper unit on the trolley,
moving the trolley with the second damper unit along the guiderail to a second position inside the tower section,
positioning the second damper unit in a second installation position being vertically offset from the centre axis of the tower section, wherein the positioning comprises elevating the second damper unit, and
attaching the second damper unit to the tower section at the second installation position.

9. The method according to claim 1, wherein the damper unit has a first orientation when mounted on the trolley and outside the tower section, and wherein the method further comprising, after moving the trolley to the position inside the tower section, rotating the damper unit to a second orientation different from the first orientation.

10. The method according to claim 9, wherein the first orientation facilitates insertion of the damper unit through the end of the tower section.

11. The method according to claim 9, wherein rotating the damper unit comprises rotating the damper unit approximately 90°.

12. The method according to claim 9, wherein the second orientation corresponds to the orientation of the damper unit when in the installation position.

13. The method according to claim 1, wherein positioning the damper unit in the installation position further comprises elevating the damper unit above the centre axis of the tower section.

14. The method according to claim 1, wherein positioning the damper unit in the installation position further comprises elevating the damper unit while being supported by the trolley.

* * * * *